Jan. 14, 1964

F. PIERCE 3,117,454

DEEP SEA DENSIMETER

Filed July 24, 1962

*INVENTOR.*
FIRTH PIERCE

BY

*V.C. Muller*
ATTORNEY.

Jan. 14, 1964  F. PIERCE  3,117,454
DEEP SEA DENSIMETER
Filed July 24, 1962  2 Sheets-Sheet 2

INVENTOR.
FIRTH PIERCE
BY
*V.C. Müller*
ATTORNEY.

3,117,454
DEEP SEA DENSIMETER
Firth Pierce, China Lake, Calif., assignor to the United States of America as represented by the Secretary of the Navy
Filed July 24, 1962, Ser. No. 212,171
7 Claims. (Cl. 73—437)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for measuring the density of liquids within extremely precise tolerances, a particular application of which is the measurement of density of sea water in situ, at any desired depth of the sea.

As is well known, it has become increasingly important to accurately measure density of sea water at various loci as part of oceanographic data which are then employed for determining speed of sound through the sea and other phenomena. A method employed for this purpose involves obtaining a sample of water from the desired depth, determining water pressure and temperature at the depth, transporting the sample to the surface of the sea, measuring its density at the surface by conventional methods, and then making suitable corrections for pressure and temperature to thus determine what its original density was at the situs where the sample was taken. As will be apparent, such process is tedious, time consuming and subject to the various errors of the instruments employed, as well as the errors which may arise through changes of gas content resulting in transporting the sample to the surface.

One of the objects of the invention is to obviate the disadvantages of the methods just referred to, and other tedious methods, and measure the density of sea water, in situ, without transporting samples to the surface.

Another object is to continuously and automatically measure the density of sea water at variable depths and variable spaced positions at such depths.

Another object is to provide apparatus which inherently compensates for temperature and pressure corrections, formerly required.

Still further objects, advantages, and salient features will become more apparent from a consideration of the description to follow, the appended claims, and the accompanying drawing, in which:

Figure 1:
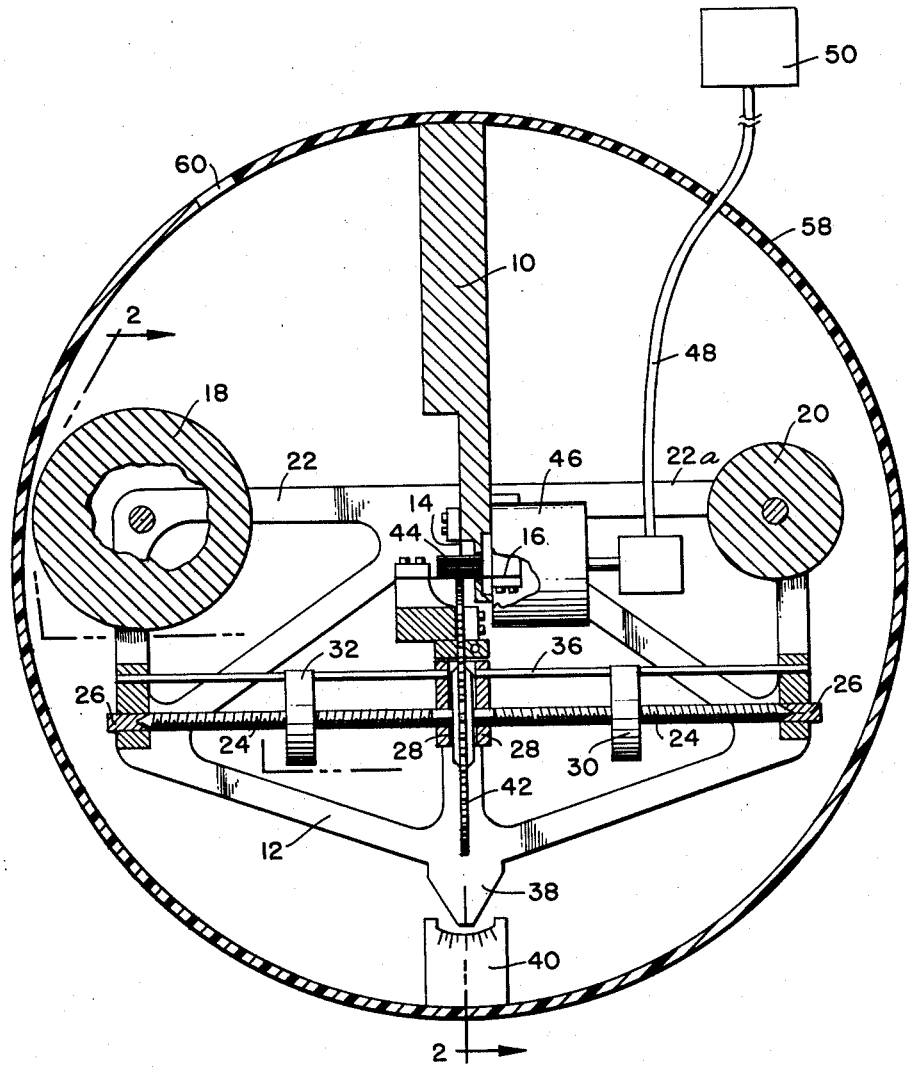
FIG. 1 is a section taken on line 1—1, FIG. 2.
Figure 2:
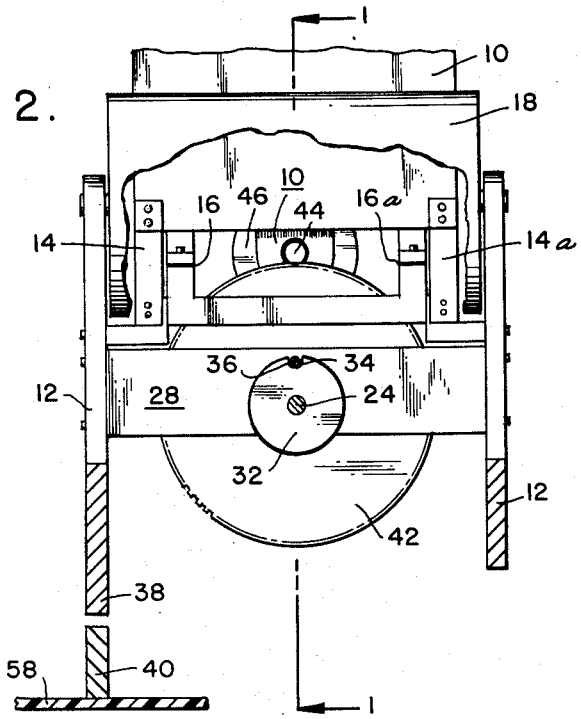
FIG. 2 is section taken on line 2—2, FIG. 1.

The invention utilizes the Archimedean principle that objects in contact with a fluid are buoyed up with a force equal to the weight of fluid displaced by the objects. Its principle utility is with fluids in liquid form and in which the objects are totally submerged in the liquid.

Referring now to the drawing, the subject of the invention comprises a support 10, which, at this point of the description, may be considered as fixed in space, which pivotally supports a balance beam 12 by Cardan type joints comprising pairs of vertical flexible members 14, 14a, each affixed at its upper and lower ends to the support and beam, respectively, and a second horizontal pair of like members 16, 16a, each affixed at its opposite ends to the support and beam. Each vertical member and the adjacent horizontal member cross each other at their mid points, the two mid points defining an axis 17 about which the beam may rotate. The pivotal suspension, just described, is commonly known as a "flexure" joint which permits pivotal movement with a minimum of frictional loss and is particularly well adapted to the present invention since it provides positive restraint of the beam relative to the support. Its function, however, is similar to the low friction knife edge pivot commonly employed on balance beams of sensitive scales.

Solid cylindrical main weights 18, 20 are affixed to opposite arms 22, 22a of the balance beam, these weights being of materials of different density, their volumes being such to balance the beam under conditions to be subsequently set forth. The balance beam rotatably supports a shaft 24, on bearings 26, 28, having right and left hand threads which threadedly engage cylindrical rider weights 30, 32 which are provided with notches 34 engaging a rod 36. As will be apparent, when shaft 24 is rotated the riders will move toward or away from each other, depending upon the direction of rotation of the shaft, with equal increments of movement. The materials employed for rider weights 30, 32 are the same, respectively, as for weights 18, 20.

Before proceeding with the description of certain optional refinements by the use of which the apparatus may be rendered automatic in operation, its operation without such refinements will now be described. It will now be assumed that main weights 18, 20 consist of 120.8 cubic centimeters of titanium and 40.8 cubic centimeters of lead, respectively, and their centers of masses are disposed 2.5 inches from the beam axis. The density of the titanium is 4.5 grams/cc. and its weight is thus 120.8×4.5=543 grams. The density of the lead is 11.34 grams/cc. and its weight is 40.8×11.34=463 grams. The difference in weight is thus 543—463 or 80 grams. The difference in volume is 120.8—40.8 or 80 cc. Since pure water weighs 1 gm./cc. and since the volume of the titanium is greater than that of the lead, the 80 cc. additional displacement of the titanium produces an upward force of 80 grams which equals the difference in weight of the two main weights, thus balancing same when submerged in pure water. (Other combinations of metals may be chosen, however, their centers of masses may require adjustments to unequal distances from the beam axis). The rider weights 30, 32 each consist of 1.17 cubic centimeters of titanium and lead, respectively, the lead weights being heavier by 8 grams. Assuming, now that the rider weights are disposed at one-tenth of the distance from the suspension axis to the center of mass of the main weights they exert a moment about the axis of one percent of the moment of the displacement difference. Employing conventional micrometer screw threads (40 per inch) on shaft 22, the riders may measure .001 gram per cubic centimeter for each full turn of the screw. If the screw is suitably indexed to indicate 1/10 of a turn it is thus possible to measure density to one part in 10,000.

While various combinations of materials may be employed for the weights, it is desirable, where density is to be determined at depth in the sea, that the materials also have different coefficients of thermal expansion and different compressibilities which are both approximately inversely proportional to their volumes. Titanium and lead have such characteristics, hence their changes in volume due to temperature and pressure inherently compensate for errors which would otherwise occur with use of materials which do not have such characteristics. It will be apparent, however, that if pressure and temperature compensation would not be required, such as determining density under a standard condition of temperature and at atmospheric pressure, this refinement may be omitted and other materials of different density may be employed.

Before determining the density of a liquid, such as sea water, the apparatus is first balanced or calibrated in distilled water, rider weights 30, 32 being suitably moved so that a pointer 38 registers with a zero point of an index 40. The apparatus is then submerged in sea water which will move the pointer away from its zero point. The number of rotations and divisions of such rotation of shaft 24 to restore the pointer to its zero point then becomes a measure of the density of the sea water. If the sample of sea water being measured is at depth in the sea and at a temperature different from the distilled water with which the apparatus was calibrated, these differences do not affect the accuracy of the apparatus since the compressibility and coefficients of thermal expansion of the materials chosen for the weights are approximately inversely proportional to their volumes as previously described.

In view of the difficulties of manually adjusting the rider weights when the apparatus is submerged in the sea, particularly at considerable depth, it is desirable to render the adjustment of such weights automatic and to transmit the number of revolutions of shaft 22 to the surface of the water, or to some other locus where it may be observed or recorded. For this purpose, shaft 24 may be provided with a gear 42 which meshes with the pinion 44 carried by the motor shaft of a reversible motor 46. The point of mesh of the pinion and gear is preferably on the axis 17 to eliminate torque between the motor and balance arm when the pinion is rotating. A flexible shaft 48 connects the motor with a revolution counter 50 disposed in a desired position for observation, and, as will be apparent, if the displacement of the balance beam away from its zero position can be sensed, the motor may be rotated in either of opposite directions of rotation to restore the beam to its zero position and the number of revolutions on the counter will be a measure of the water density.

Figure 4:
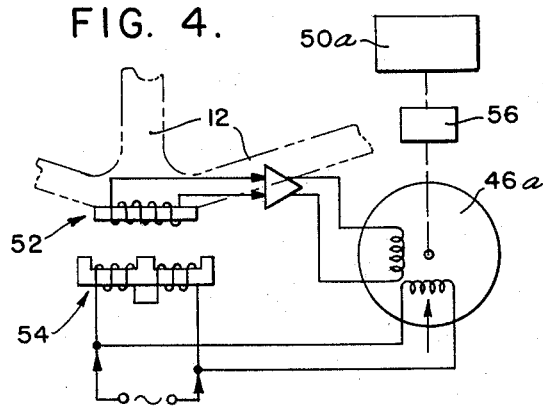
FIG. 4 is a schematic wiring diagram of an automatic control.
Figure 3:
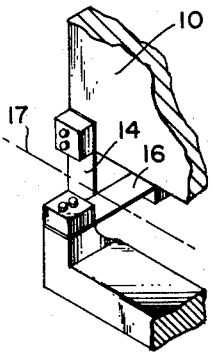
FIG. 3 is an isometric view of a detail.

As will now become apparent, pointed 38 is only exemplary of some means by which the beam may be restored to its zero or null position. Other apparatus for attaining this result is illustrated in FIG. 4 where a coil 52 is employed in lieu of the pointer and which swings with the beam adjacent a fixed E coil 54, this combination of coils providing a well known form of displacement sensing pick-up. If coil 54 is now energized and coil 52 moved away from its central or null position, as shown, an error signal will be induced in coil 52, from which it may be determined which way coil 52 must be moved back to null position. As will be apparent, this signal may be transmitted to any remote station and the reversible motor caused to rotate in the proper direction to restore coil 52 to null position, the number of revolutions of the counter being observed at the remote station as an indication of water density. Also, as shown in FIG. 4, the error signal may be employed to automatically restore the beam to null position by utilizing a two-phase servo motor 46a, one phase of which is continuously excited and the other phase controlled by the error signal and a servo amplifier. To obviate a flexible shaft between motor and a remote revolution counter, the change in position of the motor shaft, in rotating a number of revolutions to restore coil 52 to null position may be telemetered by any well known telemetering apparatus 56 to a counter 50a located at a remote station.

To protect the various delicate parts against damage, a transparent casing 58 may be provided in which they are housed, one or more apertures 60 being provided in the casing to permit entry of the liquid. When used in the sea, the apparatus may be disposed at desired depth in any manner desired, such as suspended by cable or carried by a submarine, apertures 60, communicating with the sea to obtain a sample of water at its temperature and pressure, in situ.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring the density of liquid, comprising; a pivoted balance beam having oppositely extending arms, a first main weight affixed to one arm, a second main weight affixed to the second arm, said main weights being of material of different densities and of such volumes that the beam is substantially balanced to a reference position in a reference liquid, such as pure water, a pair of rider weights each carried by an arm and simultaneously adjustable in equal increments toward or away from the beam pivot, said rider weights being of the same volume and of materials of different densities, said beam and all of said weights adapted to be submerged in a second liquid, the density of which is to be measured, whereby all weights are buoyed by said second liquid, means for sensing the displacement of said beam away from said reference position when submerged in said second liquid, and means for simultaneously moving said rider weights to positions such that said beam is restored to said reference position, the movement aforesaid being an indication of the density of said second liquid relative to the reference liquid.

2. Apparatus in accordance with claim 1 wherein said first and second weights are of materials of different coefficients of thermal expansion and compressibilities which are approximately inversely proportional to their volumes, each rider weight carried by an arm being of the same material as the main weight carried by the opposite arm.

3. Apparatus in accordance with claim 2 wherein one main weight is composed of titanium and the other of lead.

4. Apparatus in accordance with claim 1 wherein said means for simultaneously moving said rider weights operates automatically in response to said means for sensing the displacement.

5. Apparatus in accordance with claim 1 wherein the means for simultaneously moving said rider weights comprises a reversible electric motor.

6. Apparatus in accordance with claim 1 wherein said means for simultaneously moving said rider weights comprises a rotatable shaft having right and left hand threads, each threadedly engaging one of said rider weights.

7. Apparatus in accordance with claim 1 wherein said means for simultaneously moving said rider weights comprises a rotatable shaft having right and left hand threads, each threadedly engaging one of said rider weights, and a reversible motor operatively connected to said shaft.

References Cited in the file of this patent

UNITED STATES PATENTS

| | | |
|---|---|---|
| 888,646 | Osborn | May 26, 1908 |
| 1,272,605 | Becker | July 16, 1918 |
| 1,800,532 | Howard | Apr. 14, 1931 |
| 2,397,038 | Obenshain et al. | Mar. 19, 1946 |